United States Patent [19]
Yanagi et al.

[11] 3,721,166
[45] March 20, 1973

[54] COMPENSATED ELECTRICALLY CONTROLLED FOCAL PLANE SHUTTER

[75] Inventors: Akio Yanagi; Shoichiro Kakuta, both of Tokyo; Kintaro Yata, Ikeda, all of Japan

[73] Assignee: Minolta Camera Kabushiki Kaisha, Osaka-shi, Japan

[22] Filed: Nov. 13, 1970

[21] Appl. No.: 89,407

[52] U.S. Cl....................95/10 CT, 95/53 EB, 95/57
[51] Int. Cl.........G03b 7/08, G03b 9/62, G03b 9/34
[58] Field of Search...............95/10 CT, 53 EB, 57 R

[56] References Cited

UNITED STATES PATENTS

| | | | |
|---|---|---|---|
| 3,429,242 | 2/1969 | Yoshida et al. | 95/10 CT |
| 3,630,136 | 12/1971 | Kitai | 95/53 EB |
| 3,498,195 | 3/1970 | Ono | 95/53 EB |
| 3,200,723 | 8/1965 | Topaz | 95/53 EB |
| 3,533,348 | 10/1970 | Yanagi et al. | 95/53 EB |
| 3,326,103 | 6/1967 | Topaz | 95/10 CT |

Primary Examiner—Samuel S. Matthews
Assistant Examiner—Russell E. Adams, Jr.
Attorney—Watson, Cole, Grindle & Watson

[57] ABSTRACT

Circuitry is provided for determining the time delay for release of a shutter curtain from a cocked position to compensate for exposure errors generated by the overlapping of first and second shutter curtains in their cocked positions. The non-uniformity between different shutter mechanisms is corrected by adjustment of a variable resistance. A switching circuit responsive to a voltage related to the brightness of an object as well as the required compensation releases the second curtain to terminate the exposure.

2 Claims, 5 Drawing Figures

COMPENSATED ELECTRICALLY CONTROLLED FOCAL PLANE SHUTTER

BACKGROUND OF THE INVENTION

The present invention relates to a focal plane shutter electrically controlled and more particularly relates to an electrically controlled focal plane shutter wherein compensation for exposure errors caused by an overlapping of two shutter curtains is provided.

In general, in a focal plane shutter two pieces of cloth or metal curtain forming an opening curtain and a closing curtain are successively moved just before the film is exposed and the exposure is effected by a slit between both curtains. When the shutter is cocked the clearance between both curtains is extremely small, however, in this case in order to prevent light from entering between the space between both curtains the shutter is cocked with an overlap of the opening and closing curtains. Therefore, both curtains are restrained in an overlapped position by restraining members simultaneously with the completion of the shutter cocking, and when released the starting positions of the edges thereof are spaced differently in accordance with the amount of the overlap.

Therefore, no matter how correctly the time from the starting of the opening curtain to the starting of the closing curtain is controlled mechanically or electrically an error results in the exposure time, and the higher the exposure speed becomes, the larger the constituent ratio of the error becomes and in the extreme case even though the shutter is released the slit clearance necessary for the exposure may not be effected.

On the contrary, in known focal plane shutter construction a mechanical correction means for the shutter operation mechanism is arranged in order that the starting time interval of the opening and closing curtains is longer than the time determined by the electric shutter control circuit, however, it is disadvantageous to complicate the mechanism of the shutter and yet for each respective shutter it is very difficult to adjust so as to correct for errors in non-uniformity.

OBJECTS OF THE INVENTION

One object of the present invention is to provide a focal plane shutter so constructed that in order to remove the prior drawbacks mentioned above, the opening and closing shutter curtains are cocked having an overlap and the shutter is automatically connected for the exposure time error based on the difference of the starting positions of the edges of both curtains at the shutter release time, and is controlled electrically so as to obtain the proper exposure time in accordance with the brightness of an object.

Another object of the present invention is to provide a focal plane shutter electrically controlled which is adjustable to easily correct the non-uniformity of the error of an individual camera, which is effected by the difference of the starting positions of the edges of both curtains at the shutter release time because of an overlap of the opening and closing curtains.

The other objects of the present invention will be apparent in the description disclosed hereinafter.

SUMMARY OF THE INVENTION

In order to attain the objects mentioned above the present invention has a focal plane shutter so constructed that to a photoconductive element connected in series to a condenser for forming a time constant element in an electric delay circuit in an electric control circuit for a focal plane shutter an adjusting resistance is connected in series, and a delay of the charging time to the fixed voltage of the condenser is effected by the adjusting resistance. Thereby, the exposure error caused by the difference of the starting positions of the edges of both curtains at the shutter release time generated by the overlap of the opening and closing curtains by the cocking of the shutter is connected.

BRIEF DESCRIPTION OF THE DRAWINGS

FIGS. 1(A)–1(C) are a cross sectional views showing the operation of the focal plane shutter in an embodiment in accordance with the present invention, wherein FIG. 1(A) shows the structure during the cocking of the shutter, FIG. 1(B) the structure with the shutter cocked, and FIG. 1(C) shows the shutter structure at the release time.

DESCRIPTION OF THE EMBODIMENT

Figure 1:
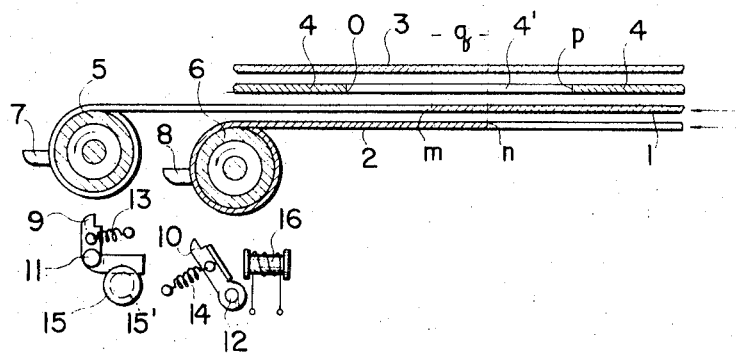
Figure 1:
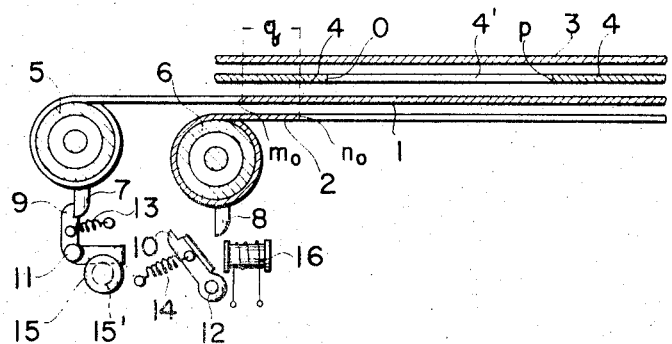
Figure 1:
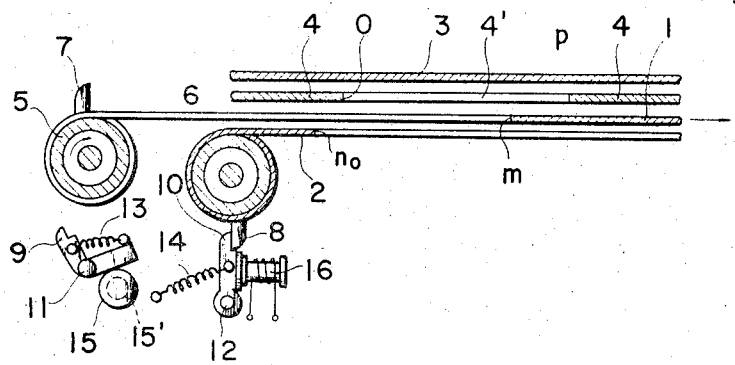

FIG. 1 shows the constructional relation of the opening and closing curtains for the focal plane shutter and the restraining mechanism therefor, the exposure window, and the sensitive film in an embodiment in accordance with the present invention, wherein reference numeral 3 denotes a sensitive film, 4 a exposure frame of the camera and 4' an exposure opening thereof. On the front of sensitive film 3 and exposure frame 4 opening curtain 1 and closing curtain 2 for the focal plane shutter are arranged so as to move, and the rear end of opening curtain is wound around opening curtain winding drum 5 and the rear end of closing curtain 2 is wound around closing curtain winding drum 6. From both winding drums 5, 6 pawls 7, 8 are projected respectively and when pawls 7, 8 are turned counter-clockwise they engage with opening curtain restraining lever 9 and closing curtain restraining lever 10 respectively.

Opening screen restraining lever 9 is supported by pin 11 and has a clockwise turning tendency by spring 13, and stays in engagement with the side of small diameter portion 15' of the release button. Therefore, the clockwise turning of pawl 7 for engaging with opening curtain restraining lever 9 is restrained. And, closing curtain restraining lever 10 fits loosely on pin 12, and has a counter-clockwise turning tendency by spring 14. And, on the back of closing curtain restraining lever 10 there is provided facing thereto electro-magnet 16 operated by the electric control circuit described later, which is excited simultaneously with the closing of power switch 23 (see FIG. 2) to attract lever 10 against spring 14, and allow it to turn simultaneously when demagnetized.

The other ends of both curtains 1, 2 are connected to the opening and closing curtain take-up reels respectively.

Now, with reference to FIG. 1(A), when cocking, the shutter opening curtain 1 and closing curtain 2 move in the direction shown by arrows and are wound respectively around winding drums 5, 6, with an overlap of a certain width $q$ between the trailing edge $m$ of opening curtain 1 and the leading edge $n$ of closing curtain 2, and after opening curtain 1 screens fully exposure opening 4' and 7 engages with opening curtain restraining lever 9 and at the same time pawl 8 engages with lever 10 and stop together with opening curtain 1 to be restrained as shown in FIG. 1(B), and thus the edges of both curtains 1, 2 are restrained at the positions $m_o$, $n_o$ to provide overlap $q$.

Next, for the shutter release, upon pushing the release button 15 opening curtain restraining lever 9 is turned counterclockwise through the large diameter portion of the release button 15 against spring 13, so as to release the restraining of pawl 7, so that opening curtain 1 is pulled by the take-up reel not shown in the drawing to start to move in the direction shown by the arrow in FIG. 1(C). At this juncture, the trailing edge $m$ of opening curtain 1 starts from position $m_o$ and when edge $m$ moves over the exposure opening edge 0 the exposure is started. However, at this time the leading edge $n$ of curtain 2 is still restrained at position $n_o$ by closing curtain restraining lever 10 which is turned by electromagnet 16 excited by switch 23 closed in interlocking with the pushing down of the shutter release button. The electric control circuit shown in FIG. 3 and described later demagnetizes electromagnet 16 after the predetermined time and turns closing curtain restraining lever 10 to release the restraining of pawl 8, so that the edge $n$ of closing curtain 2 starts from the position $n_o$ to form a slit of a certain width between the edge $m$ of opening curtain 1 and the edge $n$ of closing curtain 2.

Figure 2:
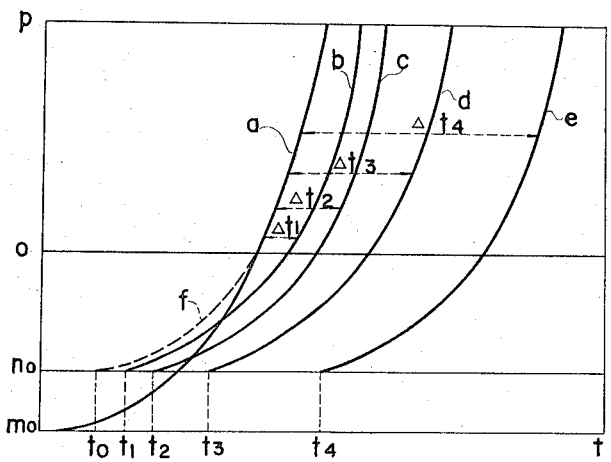
FIG. 2 is a diagram showing the delay time to correct the exposure time error effected by the difference of the starting positions of the edges of the opening and closing curtains at the release time.

FIG. 2 is a diagram showing the relation between the time lag of the running start of the opening and closing curtains and the exposure time, and the movements of the edges of both curtains, and the abscissa denotes time $t$ and the ordinate denotes the running displacement of the edge of the shutter.

In FIG. 2, curve $a$ shows the moving state of the rear edge $m$ of opening curtain 1, and curves $b$, $c$, $d$, $e$ show the moving state of the front edge $n$ of closing curtain 2, which starts at various exposure times (time lag of the running start). And, $m_o$ represents a starting position of the rear edge $m$ of opening curtain 1 and $n_o$ represents a starting position of the front edge $n$ of closing curtain 2. And, $t_0$, $t_1$, $t_2$, $t_3$, $t_4$ show the starting time difference between both curtains from the running start of opening curtain 1 to the running start of closing curtain 2. And, 0 shows a position where the exposure effected by the moving of opening curtain 1 relative to film 3 or the screening effected by the moving of closing curtain 2 is started, and P shows a position where that operation is finished, and both positions correspond respectively to points O. P in FIG. 1 and show both ends of exposure opening 4'.

The transverse interval $\Delta t_1$, $\Delta t_2$, $\Delta t_3$, $\Delta t_4$ between curve $a$ and the other curves $b$, $c$, $d$, $e$ are the exposure times actually exposed of the sensitive film. Thus, when closing curtain 2 starts after $t_o$ from the running start of opening curtain 1, the running curve shown by dotted line $f$ becomes curve $a$ of opening curtain 1 between O and P in exposure opening 4', and when the starting time difference of closing curtain 2 is shorter than $t_o$ the edges of opening curtain 1 and closing curtain 2 overlap one another so as not to provide an exposure of the sensitive film at all.

That is, between the exposure time T of the film and the starting time difference $t_s$ of both curtains the following relation exists:

$$T = t_3 - t_o \quad (1)$$

wherein $t_o$ is a proper constant of a respective focal plane shutter.

And, when the electric control circuit controls the starting time difference $t_s$ of both curtains as a proper exposure time the exposure time of the film becomes $t_o$ less than $t_s$ and the smaller the starting time difference $t_s$ of both curtains, namely, the higher the exposure speed, and the larger that influence becomes.

From formula 1 $t_s = T + t_o$ \quad (1)' wherein $t_o$ is a proper constant of a respective focal plane shutter.

And, when the electric control circuit controls the starting time difference $t_s$ of both curtains as a proper exposure time the exposure time of the film becomes $t_o$ less than $t_s$ and the smaller the starting time difference $t_s$ of both curtains, namely, the higher the exposure speed, and the larger that influence becomes.

From formula 1 $t_s = T + t_o$ \quad (1)'

That is, the electric control circuit is only required to operate so as to delay the starting time difference $t_s$ of both curtains as much as the proper time $t_o$ of the focal plane shutter more than the proper exposure time T.

Figure 3:
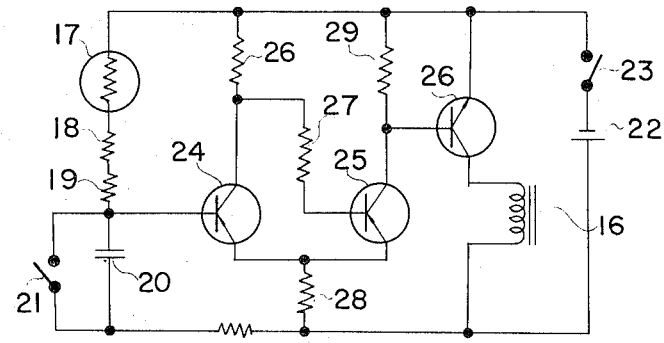
FIG. 3 shows the electric control circuit of an embodiment in accordance with the present invention.

FIG. 3 shows an embodiment of the electric control circuit operating as described above, wherein to photoconductive element 17 there is connected in series adjustable resistance 18 the resistance $r$ of which produces a delay time equivalent to the delay time of about 0.006 sec. up to the time when the edge of opening curtain 1 moves to the edge of closing curtain 2 due to the aforementioned overlap of the opening and closing curtains. And, resistance 19 connected in series to resistance 18 is a resistance for correcting the characteristic of photoconductive element 17, which can be removed in order to make the resistance of resistance 19 zero depending upon the characteristic of photoconductive element 17.

To the aforementioned resistors there is connected in series delay condenser 20 to which timing switch 21 is connected in parallel. The CR node of the electric delay circuit formed as described above is connected to the base of transistor 24, and transistor 24 forms a Schmidt trigger circuit together with transistor 25 and resistances 26, 27, 28. The collector of transistor 25 is connected to the base of amplifier transistor 26, and resistance 29 forms a bias resistance of transistor 26 and to the collector of transistor 26 electromagnet 16 is connected. Reference numeral 22 denotes an electric power source and 23 is an electric switch.

In interlocking with the shutter release button (see FIG. 1), when, first, power switch 23 is closed and then as shown in FIG. 1(C) timing switch 21 not shown in FIG. 1 is opened in synchronization with the starting of opening curtain 1, delay condenser 20 is charged by the current passing through photoconductive element 17 and adjustable resistance 18 (resistance 19 is disregarded). And, when the charging voltage of condenser 20 gets to a certain voltage $V_1$ the Schmidt trigger circuit actuates amplifier transistor 26 and de-energizes electromagnet 16 to demagnetize it, and accordingly closing curtain restraining lever 10 is turned in FIG. 1(C) to release closing curtain 2 and closing curtain starts to move. Provided the delay time is $t_f$ the following formulas are applicable:

$$t_f = C(R+r) \log \frac{1}{1-\frac{V_1}{E}}$$

$$t_f = C \cdot R \log \frac{1}{1-\frac{V_1}{E}} + C \cdot r \log \frac{1}{1-\frac{V_1}{E}} \quad (2)$$

Wherein,
C — electrostatic capacity of condenser 20
R — photo resistance of photoconductive element 17
E — voltage of power source 22
r — resistance value of adjusting resistance 18.

And, between the photo resistance of photoconductive element 17 and the quantity I of light incident to photoconductive element 17 in accordance with the lightness of an object there is the following relation:

$$R = A \cdot I^{-\gamma} \quad (3)$$

wherein A and $\gamma$ are a constant respectively.

Here, provided the photoconductive element is used for $\gamma = 1$, from formulas 2 and 3

$$t_f = \frac{B}{I} + C \cdot r \log \frac{1}{1-\frac{V_1}{E}}$$

wherein $$B = C \cdot A \log \frac{1}{1-\frac{V_1}{E}}$$

and this is a constant.

That is, the time $t_f$ from the opening to the closing of the shutter is given by the intensity I of light incident to photoconductive element 17, namely, the function of the lightness of an object, and composed of a term in inverse proportion to intensity I and a constant term.

And, (B/I) corresponds to the exposure time T in formula 1 and when the resistance r of resistance 18 is set up so as to satisfy the following formula:

$$C \cdot r \log \frac{1}{1-\frac{V_1}{E}} = t_o$$

$t_f = T + t_o$ and $t_f = t_s$ can be obtained, that is, the starting time difference of both curtains can be obtained as required.

In the present invention, as described hereinbefore by inserting adjustable resistance r of a certain value in series with the photoconductive element in the electric delay circuit of the electric control circuit, the exposure error based on the difference of the starting positions of the edges of the opening and closing curtains at the release time, due to the overlap of the cocked opening and closing curtains of the exposure time for a focal plane shutter is automatically corrected and thereby it is possible to effect the proper exposure control.

Adjustable resistance 18 in the present invention is quite different from resistance 19 connected in series or parallel to photoconductive element 17, in order to correct the characteristic of element 17.

Besides, in the present invention the adjusting resistance is arranged as an adjustable resistance, and the non-uniformity of the exposure errors is corrected by adjusting the resistance of the adjustable resistance in accordance with the non-uniformity determined after the camera is built. Thereby the adjustment of the exposure control can be effected very easily by selecting the resistance in accordance with the above formulas.

We claim:
1. An electrically controlled focal plane shutter for a camera, comprising:
a first curtain movable from a cocked position to a rest position for initiating film exposure;
a second curtain movable from a cocked position to a rest position for terminating the film exposure, the trailing edge portion of said first curtain and the leading edge portion of said second curtain overlapping one another with said first and second curtain in said cocked positions;
an electric power source;
means for releasing said second curtain from said cocked position after a time delay;
an electric timing device for determining said time delay and controlling said means for releasing and including;
a variable resistor;
a capacitor connected in series with said variable resistor;
an adjustable compensating resistor connected in series with said variable resistor and said capacitor for adding a time lapse delay to said time delay for compensating exposure errors caused by the overlapping of said first and second curtains in said cocked positions, the resistance r of said adjustable compensation resistor is adjusted in accordance with the following formula:

$$C \cdot r \log \frac{1}{1-\frac{V_1}{E}} = t_o$$

where C is the capacitance of said capacitor, E is the voltage of said power source, $V_1$ is the voltage at the junction of said capacitor and said compensation resistor, and $t_o$ is a time delay equivalent to the overlapping of said first and second curtains; and
a switching circuit responsive to said set voltage.

2. An electrically controlled focal plane shutter for a camera as set forth in claim 1, wherein said variable resistor includes a photoconductive element.

* * * * *